(12) United States Patent
Lowther

(10) Patent No.: US 6,987,337 B2
(45) Date of Patent: Jan. 17, 2006

(54) CAM LOCKED AIR GAP BAFFLE ASSEMBLY FOR A DYNAMOELECTRIC MACHINE

(75) Inventor: Gary R. Lowther, Casselberry, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 42 days.

(21) Appl. No.: 10/754,193

(22) Filed: Jan. 9, 2004

(65) Prior Publication Data

US 2005/0151430 A1     Jul. 14, 2005

(51) Int. Cl.
*H02K 9/00* (2006.01)
(52) U.S. Cl. .......................................... 310/54; 310/58
(58) Field of Classification Search .................. 310/52, 310/57, 58, 59, 60 R, 60 A, 64, 65
See application file for complete search history.

(56) References Cited

U.S. PATENT DOCUMENTS

| | | | |
|---|---|---|---|
| 2,994,004 A | * | 7/1961 | Macha et al. .................. 310/42 |
| 3,110,827 A | | 11/1963 | Baudry |
| 3,182,949 A | * | 5/1965 | Schacht ........................ 249/60 |
| 3,265,912 A | | 8/1966 | Baudry |
| 3,439,202 A | | 4/1969 | Wanke |
| 3,497,737 A | * | 2/1970 | Philofsky ...................... 310/54 |
| 3,529,189 A | | 9/1970 | Armstrong |
| 4,315,173 A | | 2/1982 | Calfo et al. |
| 4,335,325 A | | 6/1982 | Miller et al. |
| 4,751,412 A | * | 6/1988 | Lowther et al. .............. 310/52 |
| 5,099,164 A | | 3/1992 | Wheeler |
| 5,177,385 A | | 1/1993 | Cooper et al. |
| 6,268,668 B1 | | 7/2001 | Jarczynski et al. |

\* cited by examiner

*Primary Examiner*—Tran Nguyen

(57) ABSTRACT

A baffle system for routing cooling fluids through a dynamoelectric machine. The baffle system may include a locking cam mechanism for releaseably attaching a baffle to a stator assembly to substantially eliminate an annular air gap between a rotor assembly and a stator assembly. The baffle system may include a locking strip attached to a stator slot wedge to seal the locking cam mechanism and baffle to the stator assembly. In other embodiments, the baffle system may include a friction pad for sealing the locking cam mechanism and baffle to the stator assembly. The baffle system may also include a locking tool for simultaneously, or individually, moving the locking cam mechanism from an unlocked position to a locked position, or vice versa.

31 Claims, 5 Drawing Sheets

CAM LOCKED AIR GAP BAFFLE ASSEMBLY FOR A DYNAMOELECTRIC MACHINE

FIELD OF THE INVENTION

This invention is directed generally to cooling systems of dynamoelectric machines, and more particularly, to systems for separating air gaps between stator and rotor assemblies to form pathways through which cooling fluids may be directed.

BACKGROUND

Large turbine dynamoelectric machines, such as generators, typically include internal cooling systems formed from a plurality of ducts in stator and rotor slots. Most generator cooling systems divide the internal spaces into a network of cooling pathways using a plurality of annular baffles. More specifically, the baffles divide the air gaps found between the stator and rotor assemblies and create a plurality of cooling zones in the cooling system. Cooling gases may be sent through these cooling zones using a blower to create high pressure zones in some of the cooling zones. For instance, alternating zones are connected to the high pressure side of a blower mounted on a rotor shaft, and the remaining zones are coupled to the low pressure side of the blower. Radial ducts through the rotor in each zone permit cooling gases to flow from the high pressure zones to the low pressure zones. Thus, the blower may move cooling gases through the cooling system.

At least one factor affecting the efficiency of dynamoelectric cooling systems is the amount of leakage past the air gap baffles. Baffle systems provide seals between rotors, which rotate relative to stators, and stators. Thus, baffles cannot be fixedly coupled to both rotors and stators. Rather, generators typically contain a plurality of baffles coupled to a rotor assembly and a plurality of baffles coupled to a stator assembly, which extend toward the baffles coupled to the rotor. Baffle systems are capable of being installed with minimal clearance between the stator baffles and rotor baffles. The rotor baffles may be formed from rings of non-magnetic material secured to the rotor surface at appropriate places along the rotor. The stator baffles may be aligned radially with the rotor baffles and are typically removably coupled to the stator to permit installation or removal of the rotor using conventional processes.

There exist numerous methods for attaching the stator baffles to a stator assembly. In at least one conventional approach, stator baffles are held in place with tapered wedges. The tapered wedges are in turn held in place with two guide cables formed of glass rope and a stainless steel tensioning cable which is tightened to lock the baffle segments in place. While this system enables baffles to be locked into position, the locking system is unnecessarily complex. Thus, a need exists for a more simplistic, efficient system for removable coupling air gap barriers to stator assemblies in dynamoelectric machines.

SUMMARY OF THE INVENTION

This invention relates to an air gap baffle system usable in dynamoelectric machines for releaseably attaching baffles to stator assemblies. The air gap baffle system may include at least one air gap baffle adapted to be coupled to a stator assembly and to be positioned between the stator assembly and a rotor assembly. The air gap baffle is not limited in configuration except that the air gap baffle should be configured to not contact baffles coupled to the rotor when the rotor is in operation and rotating. The air gap baffle system may also include one or more locking cam assemblies for attaching the air gap baffle to a stator assembly. The locking cam assembly may be configured to be coupled to the air gap barrier and may have at least one cam for locking the baffle to the stator assembly. In addition, the cam may include an inner cavity extending through the cam for receiving a locking tool. The inner cavity may include one or more keyways in an inner wall of the inner cavity for receiving a key on the locking tool. The cam may be movable between a first unlocked position in the which the cam has a first diameter and a second locked position in which a second diameter of the cam, which is greater than the first diameter of the cam, is secured against the stator assembly.

The air gap barrier system may also include one or more locking strips for preventing the locking cam assembly from inadvertently moving from a locked position to an unlocked position. In at least one embodiment, a locking strip may be attached to a stator assembly between the cam and a stator slot wedge of a stator assembly. The locking strip may be formed from materials, such as, but not limited to, glass laminates.

The air gap barrier system may also include a friction pad. The friction pad may be positioned between the cam and a stator slot wedge of a stator assembly. The friction pad may also prevent the locking cam assembly from inadvertently moving from a locked position to an unlocked position. The friction pad may be formed from materials, such as, but not limited to, a TEFLON coated cloth, a porous cloth adapted to receive a resin, a rubber material, or other appropriate materials. In at least one embodiment, the friction pad may be formed from a top layer and a bottom layer. The bottom layer may be, but is not limited to, a porous cloth, and the top layer may be, but is not limited to, a TEFLON coated cloth, rubber, or other appropriate material.

The air gap barrier system may also include a locking tool for moving the locking cam assembly between an unlocked position and a locked position, or vice versa. The locking tool may be capable of actuating a plurality of locking cam assemblies simultaneously by inserting the locking tool through inner cavities of cams. The locking tool may include one or more keys extending from an outer surface. The key may be positioned and sized to fit into a keyway in an inner wall forming a cavity in a cam. In an alternative embodiment, the locking tool may include one or more keyways and a cavity in a cam may include one or more keys. In at least one embodiment, the locking tool may include two keys extending from the locking tool approximately 180 degrees apart. The keys may extend the length of the locking tool, or may be placed an intermittent locations along the length of the tool in locations corresponding to the keyways in the cams. The locking tool is preferably bendable in the radial direction to enable the tool to be bent around support structures on a dynamoelectric machine to enable the tool to be inserted through locking cam assemblies without requiring such support structures to be disassembled and removed. However, the locking tool preferably resists twisting about the longitudinal axis of the locking tool. In at least one embodiment, the locking tool is formed from a generally cylindrical shaft.

The air gap baffle system may be used to attach a baffle to a stator assembly using a locking cam assembly. A stator baffle, which remains stationary during operation of a dynamoelectric machine, may be installed in an upper groove of a conventional stator assembly. The locking cam assembly may be positioned between the stator baffle and a stator wedge of the stator assembly. The cam of the locking cam assembly may be moved from a locked position to an unlocked position using a locking tool. The locking tool may be inserted into the can so that the keys on the locking tool mesh with the keyways in the cam. The locking tool may be used to rotate the cam to a locked position. In at least one embodiment, the locking cam mechanism is rotated about 90 degrees to move the cam mechanism from an unlocked position to a locked position.

The locking tool may also be used to move a plurality of locking cam mechanisms from a locked position to an unlocked position. In at least one embodiment, a plurality of baffles may be attached to stator assemblies along the length of a rotor using one or more locking cam assemblies. At least a portion of the locking cam assemblies may be positioned generally along a longitudinal axis. The locking tool may be bent around support structures of a dynamoelectric machine and inserted through a plurality of cams. The locking tool may then be rotated to rotated the cams from locked positions to unlocked positions, or vice versa, simultaneously.

An advantage of this invention is that the cam mechanisms provide increased reliability for releasable attachment systems for air gap baffles.

Another advantage of this invention is that the friction pad and the locking strip reduce the likelihood that a locking cam mechanism will inadvertently move from a locked position to an unlocked position.

Yet another advantage of this invention is the locking tool is capable of moving a plurality of cams from unlocked positions to locked positions simultaneously, thereby enabling a user to lock all of the cam mechanisms in a shorter amount of time.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
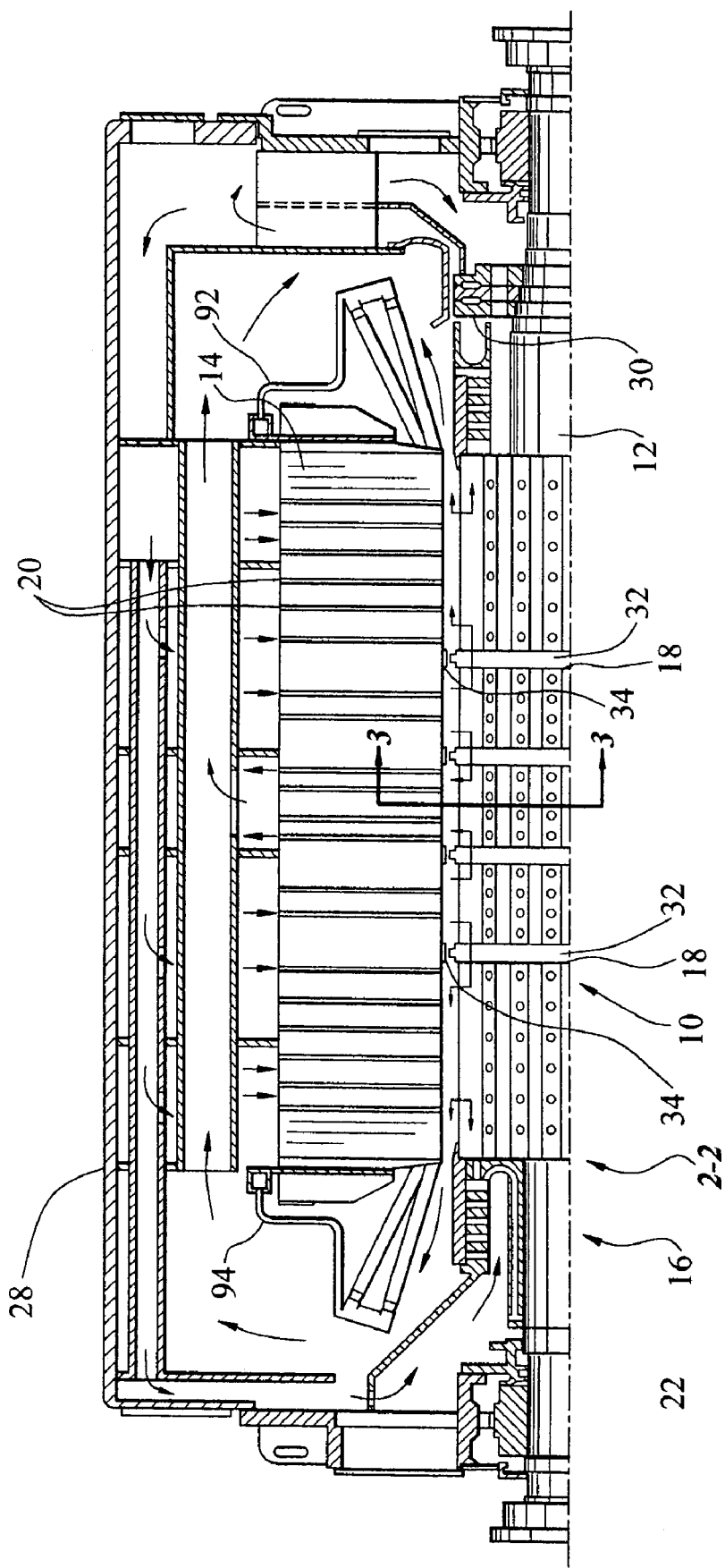
FIG. 1 is a sectional view of an upper half of a dynamoelectric machine including aspects of this invention.

As shown in FIGS. 1–10, this invention is directed to a barrier system 10 for sealing air gaps found between stators 12 and rotors 14 in dynamoelectric machines 16. The barrier system 10 positions baffles 18 between stators 12 and rotors 14 to form a plurality of cooling pathways 20 for passing cooling fluids through the dynamoelectric machine 16 from high pressure zones to low pressure zones to cool the components thereof. The barrier system 10, in at least one embodiment, is configured to facilitate easy installation and removal of the baffles 18 by enabling a plurality of cams 40 to be rotated simultaneously to lock the baffles in position between the stators 12 and the rotors 14.

As shown in FIG. 1, the dynamoelectric machine 16 may be formed from a stator assembly 12 and a rotor assembly 14. The stator assembly 12 may be a conventional stator or other stator and may be formed from a laminated annular core having a cylindrical bore 22. The stator assembly 12 may be formed from a plurality of laminations forming cooling pathways 20. The stator assembly 12 may also include one of more slots for containing half coils. The rotor assembly 14 may be disposed in the bore 22 of the stator assembly 12 and separated from the stator assembly 12 by an annular air gap 26. The rotor assembly 14 may be supported in a housing 28 by any appropriate device, which may include, bearings at the end of the rotor assembly 14. The rotor assembly 14 may also include seals for preventing leakage of gases from the housing 28.

The housing 28 may be sealed as tightly as possible to prevent cooling fluids from escaping. The housing 28 may be filled with cooling fluids, such as, but not limited to, hydrogen, for cooling the various components of the dynamoelectric machine 16. The dynamoelectric machine 16 may also include a blower 30, which may be any suitable type, for circulating cooling fluids. The cooling fluids in the dynamoelectric machine 16 may be maintained at a static pressure of between about 30 pounds per square inch (psi) and about 75 psi. The barrier system 10 may be used to establish various cooling pathways 20 through the dynamoelectric machine 16. In addition, the barrier system 10 creates areas of differential pressure, which facilitates circulation of the cooling fluids through the dynamoelectric machine 16.

As shown in FIG. 1, the dynamoelectric machine 16 may include a plurality of annular baffles 18. The baffles 18 may consist of one or more rotational baffles 32 coupled to the rotor assembly 14 and one or more stationary baffles 34 coupled to the stator assembly 12. The rotational and stationary baffles 32 and 34 may have a small clearance, such as, but not limited to, about 1/16 of an inch, between each other when assembled in the dynamoelectric machine 16 to minimize gas leakage. The stationary baffles 34 may be releasably positioned in the dynamoelectric machine 16 to enable to rotor to be installed or removed without interference from the baffles 32 and 34 and without risk of damaging the baffles 32 and 34.

Figure 2:
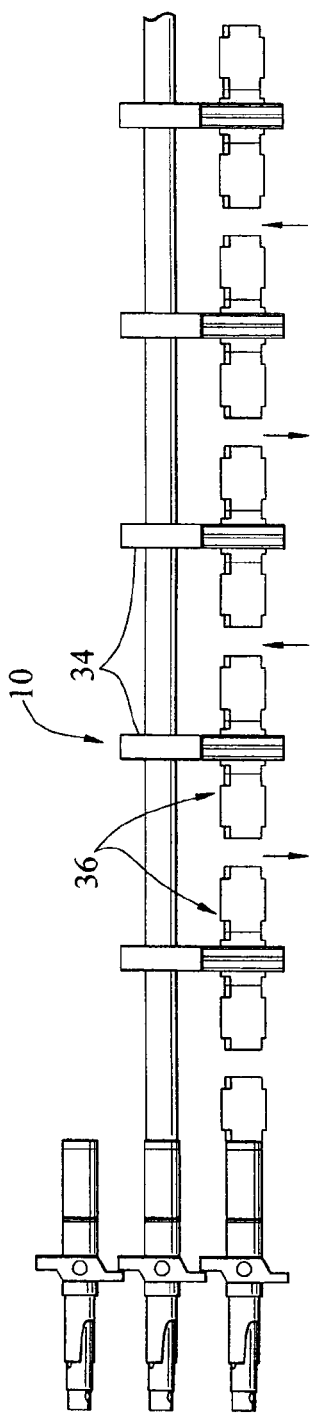
FIG. 2 is a detailed view taken along 2—2 in FIG. 1.
Figure 3:
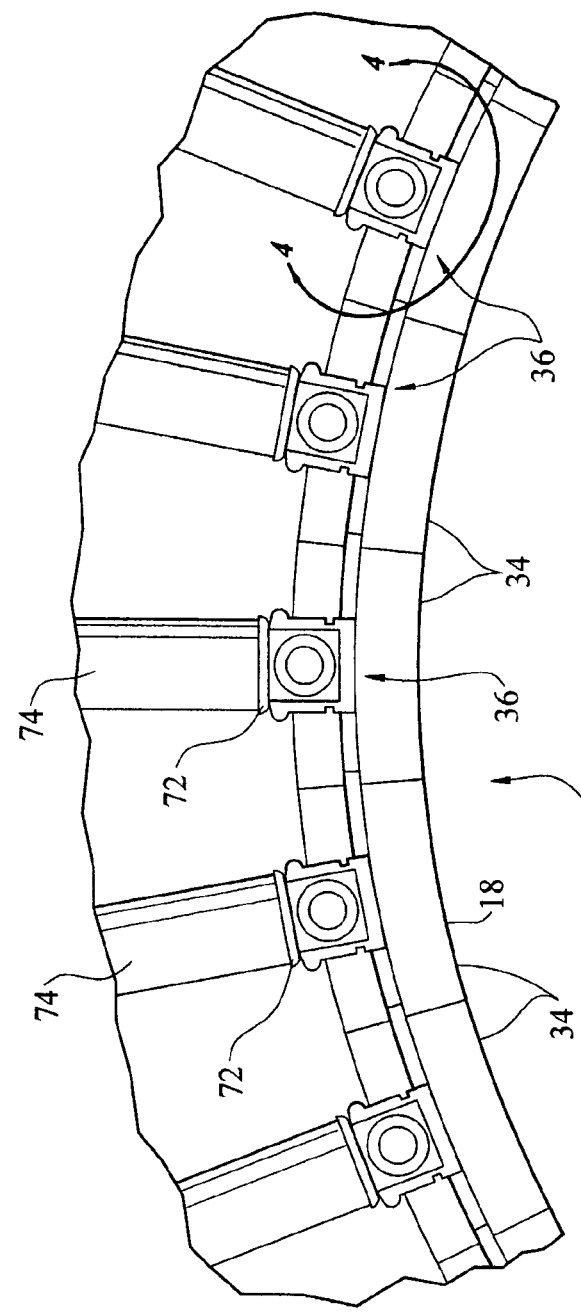
FIG. 3 is a cross-sectional view of the barrier system taken along 3—3 in FIG. 1.
Figure 4:
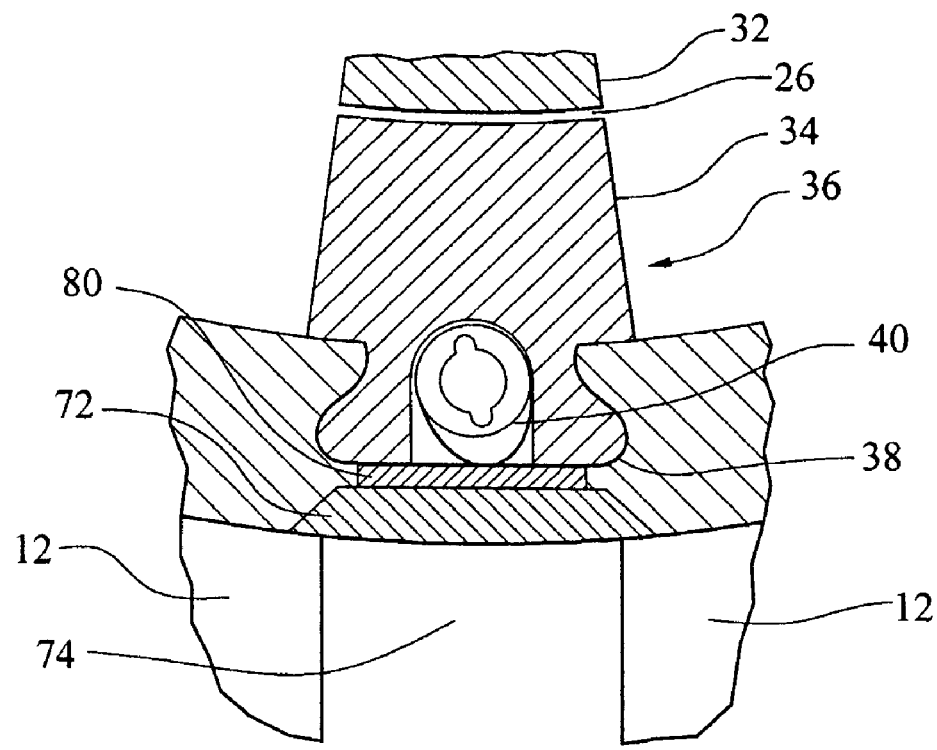
FIG. 4 is a detailed view taken along 4—4 in FIG. 3.
Figure 5:
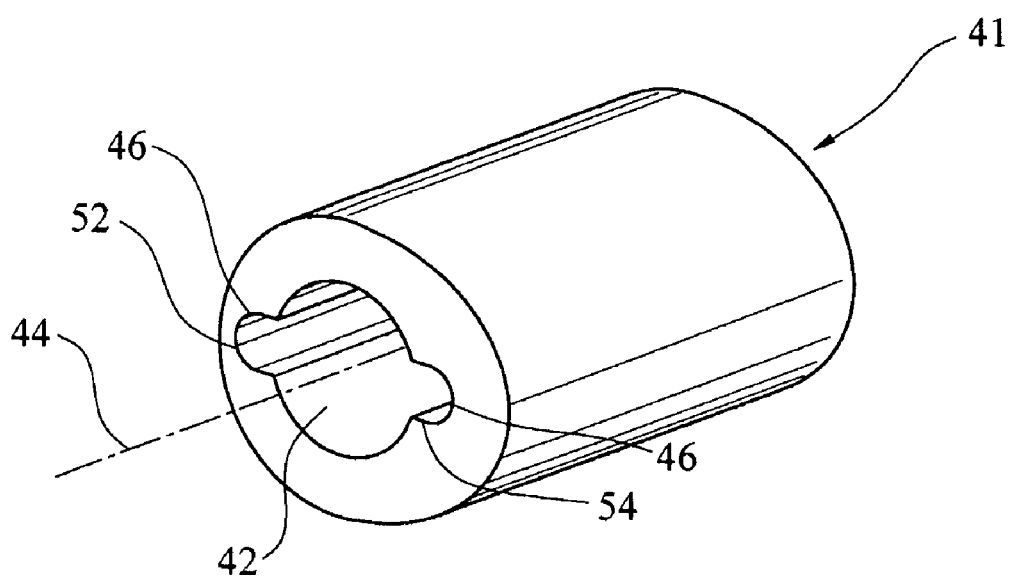
FIG. 5 is a perspective view of a component of a locking cam assembly of this invention.
Figure 8:
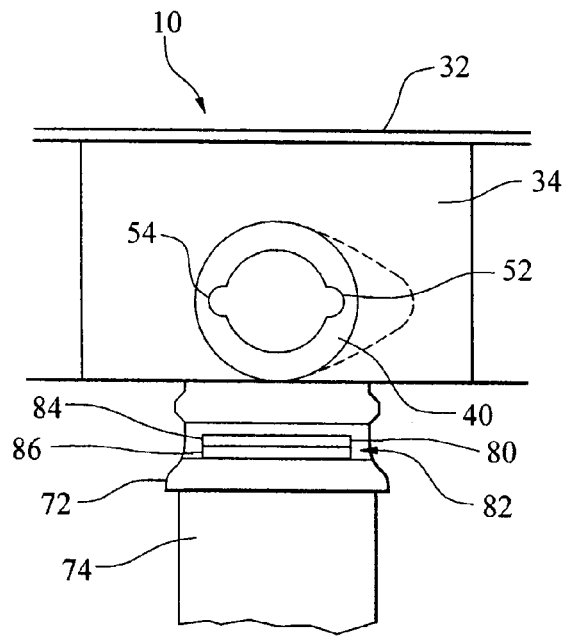
FIG. 8 is a frontal view of an embodiment of the barrier system of this invention in an unlocked position.
Figure 9:
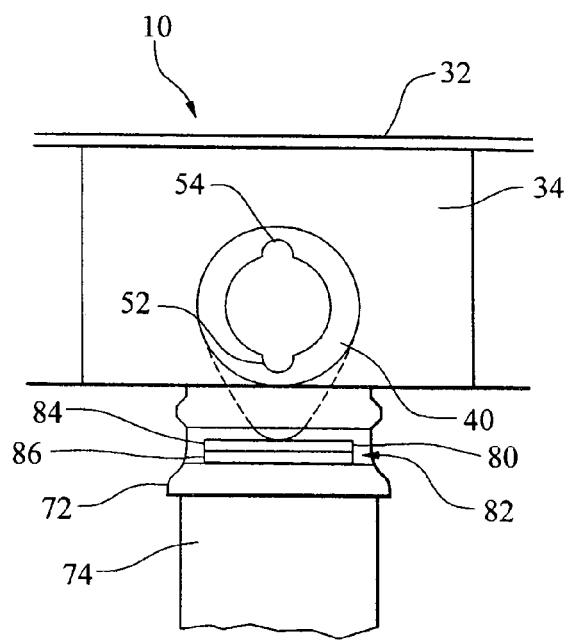
FIG. 9 is a frontal view of an embodiment of the barrier system of this invention in an locked position.

The barrier system 10 may include at least one locking cam assembly 36, as shown in FIGS. 2–4, for holding one or more stationary baffles 34 in place in the dynamoelectric machine 16. The locking cam assembly 36 may be configured to attach a stationary baffle 34 to a stator assembly 12 by bearing against to an upper groove 38 of a stator assembly 12 and a stator slot wedge 72. The locking cam assembly 36 may include one or more cams 40. In at least one embodiment, the cam 40 may rotate between an unlocked position, as shown in FIG. 8, and a locked position, as shown in FIG. 9. In at least one embodiment, the cam 40 may include an inner cavity 42 extending through the cam 40. The inner cavity 42 may be generally parallel to a longitudinal axis 44 of the cam 40. The inner cavity 42 may include one or more keyways 46 for receiving a key 48 on a locking tool 50. In an alternative embodiment, the cam 40 may include one or more keys 48 and the locking tool 50 may include one or more keyways 46. The cam 40 may, in at least one embodiment, be formed from a cam 40 and a sleeve 41 shown in FIG. 5.

In at least one embodiment, the inner cavity 42 may include two keyways 52 and 54 for receiving keys 48. The keyways 52 and 54 may extend entirely through the cam 40 enabling keys 48 to be inserted through the cam 40 to engage keyways in an adjacent cam 40. The keyways 52 and 54 may also be positioned about 180 degrees apart. The keyways 52 and 54 may be sized slightly larger than the keys 48 to enable the keys 48 to be easily inserted into, or withdrawn from, the keyways 52 and 54, yet provide sufficient contact with the cam 40 to enable the locking tool 50 to rotate the cam 40.

Figure 10:
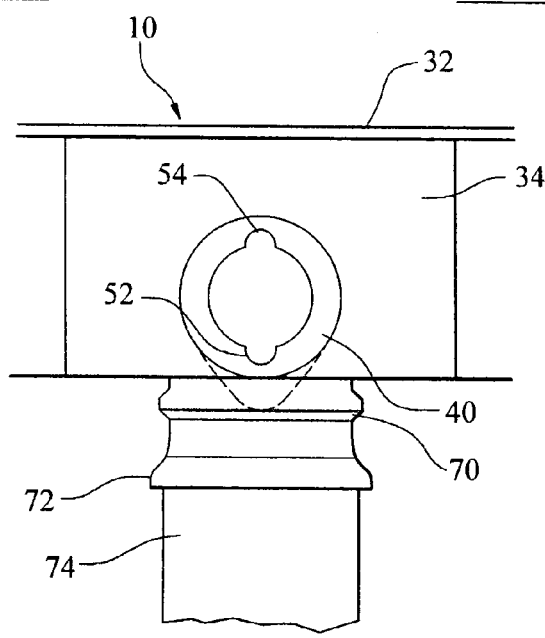
FIG. 10 is a frontal view of an alternative embodiment of the barrier system of this invention in an locked position.

In at least one embodiment, as shown in FIGS. 8–10, the keyways 52 and 54 may be positioned on the cam 40 so that the cam 40 is in an unlocked position when the keyways 52 and 54 are generally parallel with the stator slot wedge 72. The cam 40, in at least one embodiment, may be locked by rotating about 90 degrees so that the keyways 52 and 54 are generally orthogonal to the stator slot wedge 72. In other embodiments, the cam 40 may be rotated from an unlocked position to a locked position by rotating the cam 40 more or less than 90 degrees, as dictated by the configuration of the cam 40.

Figure 6:
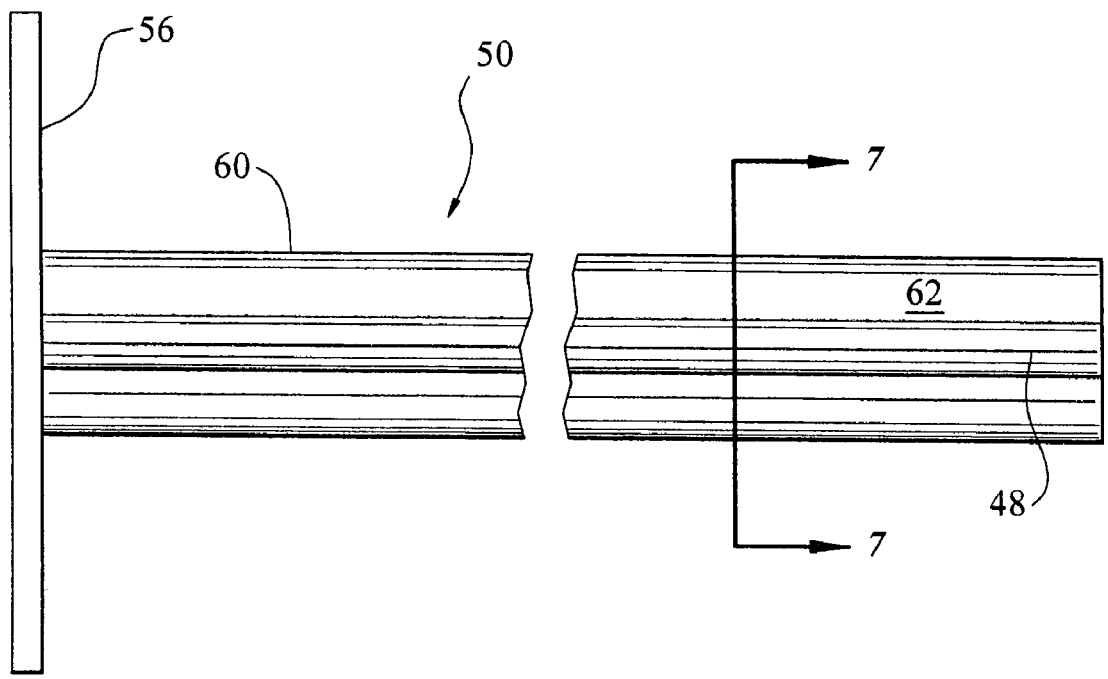
FIG. 6 is a side view of a locking tool of this invention.
Figure 7:
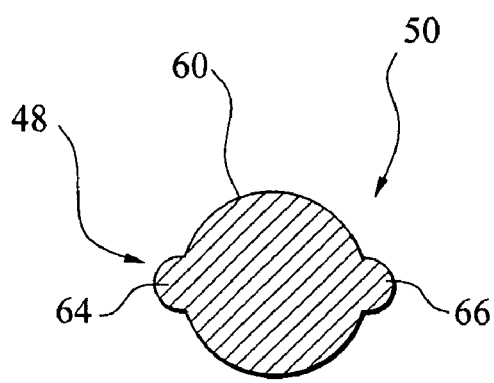
FIG. 7 is a cross-sectional view of the locking tool taken along lines 7—7 in FIG. 6.

The locking tool 50 may be formed from a shaft 60 having at least one key 48 extending from an outer surface 62 of the shaft, as shown in FIGS. 6 and 7. The locking tool 50 may also include a handle 56 for facilitating rotation of the locking tool 50 while engaged with one or more cams 40. The handle 50 may have any appropriate configuration enabling a user to rotate the locking tool 50 while engaged to one or more cams 40. In at least one embodiment, the shaft 60 may be cylindrical to resist twisting. The shape of the shaft 60 is not limited to being cylindrical. Rather, the shaft 60 may have any cross-section that resists twisting and thereby enables the locking tool 50 to be used to lock multiple locking cam assemblies 36 simultaneously. The shaft 60 may be formed from a treated tool steel or other appropriate material capable of resisting twisting.

While the shaft 60 preferable is resistant to twisting about its longitudinal axis, the shaft 60 may be bendable in the radial direction to permit the locking tool 50 to be inserted past various support structures of the dynamoelectric machine 16 without requiring removal of these components. This results in a tremendous time savings. In at least one embodiment, as shown in FIG. 7, the shaft 60 may include two keys 64 and 66, which may be referred to as wings, extending the entire length of the locking tool 50. In other embodiments, the keys 64 and 66 do not extend the entire length of the locking tool 50. Instead, the keys 64 and 66 may be positioned intermittingly along the length of the locking tool 50 at locations corresponding to the cams 40 positioned at intervals along the length of the dynamoelectric machine 16.

The barrier system 10 may also include a locking strip 70 for sealing the cam 40 to the stator assembly 12. In at least one embodiment, the locking strip 70 may be configured to seal the cam 40 to a stator slot wedge 72, as shown in FIG. 10, positioned over a stator slot 74. The locking strip 70 may be formed of materials, such as, but not limited to, a glass laminates, and other appropriate materials. In at least one embodiment, the stator locking strip 70 may be glued in place on the stator slot wedge 72.

The baffle system 10 may include a friction pad 80, as shown in FIGS. 8 and 9, for sealing the cam 40 to a stator slot wedge 72. The friction pad 80 may be used without a locking strip 70, as shown in FIGS. 8 and 9, or may be used together with a locking strip 70. The friction pad 80 may be designed to prevent the cam 40 from inadvertently moving from a locked positioned to an unlocked position. The size of the cam 40, as shown in FIGS. 8 and 9, may vary from the size shown in FIG. 10 depending on whether a friction pad 80 is used or whether a locking strip 70 is used, or both. As shown in FIGS. 8 and 9, the friction pad 80 may be formed from one or more layers 82. In at least one embodiment, the friction pad 80 may be formed from a top layer 84 and a bottom layer 86. The bottom layer 86 may be formed from materials, such as, but not limited to, a porous cloth adapted to receive a resin. The top layer 84 may be formed from materials, such as, but not limited to, a TEFLON coated cloth, rubber, or other appropriate material. The TEFLON coated cloth may facilitate moving the cam 40 between an unlocked position and a locked position, or vice versa. In contrast, a top layer 84 formed of rubber has a higher coefficient of friction than the TEFLON coated cloth and thus, is more difficult to move between unlocked and locked positions, or vice versa. The top layer 84 formed of rubber may also prevent the cam 40 from unexpectedly moving from a locked position during operation of the dynamoelectric machine 16.

In at least one embodiment, the cam 40 may be formed from a glass laminate. In some embodiments, it may be difficult to rotate the cam 40 when in contact with another glass surface, the locking strip 70, or the friction pad 80. The TEFLON layer may allow the cam 40 to rotate with less force than a layer without TEFLON. The porous cloth can be attached to a locking strip 70 or on a stator slot wedge 72 with an adhesive or other appropriate material. This embodiment enables the cam 40 to elastically deform the TEFLON coated cloth to compress the material and securely attach the cam 40 to the stator slot wedge 72 or the locking strip 70. The locking strips 70 or stator slot wedges 72 may be attached to the stator assembly 12 in punching grooves (not shown). The TEFLON coated cloth is also not adversely affected by oils that may be present in the housing 28 and the air gap 26.

The rubber top layer 84 may provide a higher locking force than the TEFLON coated cloth. The rubber top layer 84 may be configured to compress or displace as the cam 40 is rotated and in contact with the rubber top layer 84. Thus, the rubber top layer 84 may provide a higher locking force for the cam 40. However, the rubber top layer 84 may be adversely affected by oils that may be present in the housing 28 and the air gap 26. The bottom layer 86 may receive an adhesive bond to attach the friction pad 80 to the cam 40 and the rubber top layer 84 may control friction between a locking strip 70 or a stator slot wedge 72. By configuring the top and bottom layers 84 and 86 to produce an interference fit with the cam 40, a strong connection may be formed.

The barrier system 10 may be installed to form portions of cooling pathways 20 to pass cooling fluids to cool inner aspects of a dynamoelectric machine 16. The barrier system 10 may be positioned between a stator assembly 12 and a rotor assembly 14 of a dynamoelectric machine 16 to prevent leakage of cooling fluids between adjacent cooling pathways 20 while allowing the rotor assembly 14 to rotate relative to a stationary stator assembly 12. One or more locking cam assemblies 36 may be positioned relative to the stator slot wedges 72. In at least one embodiment, a dynamoelectric engine 16 may include a plurality of stationary baffles 34 positioned annularly about the rotor assembly 14.

Each of the stationary baffles 34 may be attached to stator slot wedges 72 using locking cam assemblies 36.

The dynamoelectric machine 16 may include a plurality of annular rings 90 of stationary baffles 34 positioned between a first end 92 of the rotor assembly 14 near the blower 30 and a second end 94 of the rotor assembly 14 opposite the blower 30. The locking cam assemblies 36 may be aligned with each other between the first and second ends 92 and 94 so that a locking tool 50 may be inserted through cams 40 aligned with each other from the first end 92 to the second end 94. In at least one embodiment, the locking tool 50 may be used to rotate the cams 40 of a plurality of locking cam assemblies 36 from unlocked positions to locked positions by rotating the locking tool 50 about 90 degrees. The locking tool 50 may lock a plurality of cams 40 in a locked position simultaneously by rotating the locking tool 50. The position of the cams 40 may be verify visually by looking at the keyways 46. In at least one embodiment, the keyways 46 may be in a generally orthogonal position relative to a stator slot wedge 72 against which the cam 40 bears against when the cam 40 is in a locked position. Once the locking cam assemblies 36 have been placed in the locked positions, the locking tool 50 may be withdrawn from the cams 40. The locking tool 50 may then be inserted into other cams 40 positioned along a longitudinal axis and the process repeated until all of the locking cam assemblies 36 have been placed in a locked position.

In other embodiments, the locking tool 50 may be used to lock cams 40 sequentially. In this embodiment, the locking tool 50 may include one or more keys 48 at an end of the locking tool 50 generally opposite the handle 56. The locking tool 50 may be inserted through a plurality of cams 40 until the keys 48 are received in a cam 40 farthest from the first cam 40 through which the locking tool 50 is inserted. The locking tool 50 may then be rotated to lock the farthest cam 40 in a locked position. The locking tool 50 may then be withdrawn and rotated until the keys 48 align with the keyways 46 in the adjacent cam 50. The locking tool 50 may then be inserted into the adjacent cam 40 and the locking process repeated to place the adjacent cam 40 into a locked position. This process may be repeated until all of the cams 40 along a single axis are in the locked position.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A barrier system for air gaps between stators and rotors in dynamoelectric machines, comprising:
    at least one air gap baffle adapted to be positioned between a stator assembly and a rotor assembly;
    at least one locking cam assembly configured to be coupled to the at least one air gap baffle and having at least one cam for receiving a locking tool including an inner cavity extending through the cam and at least one keyway in an inner wall of the inner cavity for receiving a key of the locking tool, wherein the at least one cam is movable between a first unlocked position in which the cam has a first diameter and a second locked position in which the cam has a second diameter that is greater than the first diameter; and
    at least one locking strip coupled to a stator slot wedge in a position to contact the cam.

2. The barrier system of claim 1, further comprising at least one friction pad coupled to the at least one locking strip.

3. The barrier system of claim 2, wherein the at least one friction pad comprises at least two layers.

4. The barrier system of claim 3, wherein the at least two layers comprises a first layer formed from a porous cloth adapted to receive a resin and a second layer formed from a TEFLON coated cloth.

5. The barrier system of claim 3, wherein the at least two layers comprises a first layer formed from a porous cloth adapted to receive a resin and a second layer formed from rubber.

6. The barrier system of claim 1, wherein the at least one keyway comprises at least two keyways positioned generally on opposite sides of the inner surface from each other and aligned generally parallel with a longitudinal axis of the at least one cam.

7. The barrier system of claim 1, wherein the inner cavity in the at least one cam is adapted to receive a locking tool having a generally cylindrical cross-section and includes at least one key extending from an outer surface of the locking tool.

8. The barrier system of claim 1, wherein the at least one locking strip is comprised of glass laminates.

9. The barrier system of claim 1, wherein the at least one air gap baffle comprises a plurality of air gap baffles and the at least one locking cam assembly comprises a plurality of locking cam assemblies having a plurality of cams, and wherein the plurality of cams are positioned along a substantially straight axis enabling a locking tool to be inserted through the plurality of cams to rotate the cams substantially simultaneously to locked positions.

10. A barrier system for air gaps between stators and rotors in dynamoelectric machines, comprising:
    at least one air gap baffle adapted to be positioned between a stator assembly and a rotor assembly;
    at least one locking cam assembly configured to be coupled to the at least one air gap baffle and having at least one cam for receiving a locking tool including an inner cavity extending through the cam and at least one keyway in an inner wall of the inner cavity for receiving a key of the locking tool, wherein the at least one cam is movable between a first unlocked position in which the cam has a first diameter and a second locked position in which the cam has a second diameter that is greater than the first diameter; and
    at least one friction pad coupled to a stator slot wedge in a position to contact the cam.

11. The barrier system of claim 10, wherein the at least one friction pad comprises at least two layers.

12. The barrier system of claim 11, wherein the at least two layers comprises a first layer formed from a porous cloth adapted to receive a resin and a second layer formed from a TEFLON coated cloth.

13. The barrier system of claim 11, wherein the at least two layers comprises a first layer formed from a porous cloth adapted to receive a resin and a second layer formed from rubber.

14. The barrier system of claim 10, wherein the at least one keyway comprises at least two keyways positioned generally on opposite sides of the inner surface from each other and aligned generally parallel with a longitudinal axis of the at least one cam.

15. The barrier system of claim 10, wherein the inner cavity in the at least one cam is adapted to receive a locking tool having a generally cylindrical cross-section and includes at least one key extending from an outer surface of the locking tool.

16. The barrier system of claim 10, further comprising at least one locking strip coupled to the stator slot wedge.

17. The barrier system of claim 16, wherein the at least one locking strip is comprised of glass laminates.

18. The barrier system of claim 10, wherein the at least one air gap baffle comprises a plurality of air gap baffles and the at least one locking cam assembly comprises a plurality of locking cam assemblies having a plurality of cams, and wherein the plurality of cams are positioned along a substantially straight axis enabling a locking tool to be inserted through the plurality of cams to rotate the cams substantially simultaneously to locked positions.

19. A barrier system for air gaps between stators and rotors in dynamoelectric machines, comprising:
   at least one air gap baffle adapted to be positioned between a stator assembly and a rotor assembly and including at least one slot;
   at least one locking cam assembly configured to be positioned in the at least one slot of the at least one air gap baffle and having at least one cam including an inner cavity extending through the cam and at least one keyway in an inner wall of the inner cavity for receiving a locking tool, wherein the at least one cam is movable between a first unlocked position in which the cam has a first diameter and a second locked position in which the cam has a second diameter that is greater than the first diameter; and
   at least one locking tool having a substantially cylindrical shaft with, at least one key extending from an outer surface of the shaft and adapted to be received in the at least one keyway in the at least one cam;
   wherein the at least one locking tool is capable of moving a plurality of locking cam assemblies to locked positions substantially simultaneously.

20. The barrier system of claim 19, further comprising at least one locking strip coupled to a stator slot wedge.

21. The barrier system of claim 20, wherein the at least one locking strip is comprised of glass laminates.

22. The barrier system of claim 19, further comprising at least one friction pad coupled to a stator slot wedge.

23. The barrier system of claim 22, wherein the at least one friction pad comprises at least two layers.

24. The barrier system of claim 19, wherein the at least one keyway comprises at least two keyways positioned generally on opposite sides of the inner surface from each other and aligned generally parallel with a longitudinal axis of the at least one cam.

25. The barrier system of claim 19, wherein the inner cavity in the at least one cam is adapted to receive a locking tool having a generally cylindrical cross-section and includes at least one key extending from an outer surface of the locking tool.

26. The barrier system of claim 19, wherein the at least one air gap baffle comprises a plurality of air gap baffles and the at least one locking cam assembly comprises a plurality of locking cam assemblies having a plurality of cams, and wherein the plurality of cams are positioned along a substantially straight axis enabling a locking tool to be inserted through the plurality of cams to rotate the cams substantially simultaneously to locked positions.

27. The barrier system of claim 19, wherein the at least one key comprises two keys positioned about 180 degrees apart.

28. The barrier system of claim 27, wherein the at least one locking tool comprises a plurality of pairs of keys positioned along the length of the locking tool to engage keyways in cams in a dynamoelectric machine.

29. A method of sealing air gaps between stators and rotors in dynamoelectric machines, comprising:
   positioning at least one air gap baffle between a stator assembly and a rotor assembly;
   positioning at least one locking cam assembly between the stator and rotor assemblies, wherein the at least one cam includes an inner cavity extending through the cam and at least one keyway in an inner wall of the inner cavity for receiving a locking tool, and wherein the at least one cam is movable between a first unlocked position in which the cam has a first diameter and a second locked position in which the cam has a second diameter that is greater than the first diameter;
   positioning at least one locking strip proximate to the at least one air gap baffle;
   inserting a portion of at least one locking tool having at least one key extending from an outer surface of the at least one locking tool into the inner cavity of the at least one cam; and
   rotating the at least one locking tool which causes the cam to rotate and hold the at least one air gap baffle in position.

30. The method of claim 29, further comprising positioning at least one friction pad between the at least one locking strip and a stator slot wedge.

31. The method of claim 29, wherein positioning at least one locking cam assembly comprises positioning a plurality of air gap baffles and a plurality of locking cam assemblies axially in a dynamoelectric machine, and inserting at least one locking tool through the cams of the locking cam assemblies so that keys on the locking tool mate with keyways in the cams, and the at least one locking tool is rotated so that the plurality of locking cam assemblies are locked substantially simultaneously.

\* \* \* \* \*